US011402830B2

United States Patent
Sullivan et al.

(10) Patent No.: US 11,402,830 B2
(45) Date of Patent: Aug. 2, 2022

(54) COLLABORATIVE AUTOMATION LOGISTICS FACILITY

(71) Applicant: Autoguide LLC, Chelmsford, MA (US)

(72) Inventors: Robert Sullivan, Wilmington, MA (US); Justin Holwell, Sterling, MA (US)

(73) Assignee: Teradyne, Inc., North Reading, MA (US)

( * ) Notice: Subject to any disclaimer, the term of this patent is extended or adjusted under 35 U.S.C. 154(b) by 399 days.

(21) Appl. No.: 16/585,935

(22) Filed: Sep. 27, 2019

(65) Prior Publication Data
US 2020/0103882 A1     Apr. 2, 2020

Related U.S. Application Data

(60) Provisional application No. 62/738,800, filed on Sep. 28, 2018.

(51) Int. Cl.
    *G05B 19/418*     (2006.01)
    *B66F 9/06*     (2006.01)
    (Continued)

(52) U.S. Cl.
    CPC ..... *G05B 19/41895* (2013.01); *B65G 1/1378* (2013.01); *B66F 9/063* (2013.01);
    (Continued)

(58) Field of Classification Search
    CPC ....... B65G 1/1378; B65G 67/20; B66F 9/063; B66F 9/0755; G05B 19/41895;
    (Continued)

(56) References Cited

U.S. PATENT DOCUMENTS 4,950,118 A * 8/1990 Mueller ................ G06Q 10/08
                                                               414/343
9,089,969 B1   7/2015 Theobald
(Continued)

OTHER PUBLICATIONS

Walter et al. A Situationally Aware Voice-commandable Robotic Forklift Working Alongside People in Unstructured Outdoor Environments. Sep. 19, 2014. [Retrieved on Nov. 19, 2019]. Retrieved from the internet. <URL: https://groups.csail.mit.edu/sls/publications/2015/Glass_FieldRobotics-15.pdf>entire document.
(Continued)

*Primary Examiner* — Tyler J Lee
*Assistant Examiner* — Yufeng Zhang
(74) *Attorney, Agent, or Firm* — Perman & Green, LLP

(57) ABSTRACT

A collaborative logistic facility management system for a logistic facility includes multiple robot autonomous guided vehicles and a system controller. The vehicles transport logistics goods or pallets between truck portals and storage locations and are configured for autonomous guidance travel, in autonomous mode and include a collaborating operator input for collaborative autonomous guided vehicle navigation and guidance. The system controller commands each vehicle to transfer the logistic goods or pallets between the truck portals and the storage locations, identifies a predetermined truck portal of a corresponding truck to be loaded or to be unloaded, and generates a collaborative zone. The controller generates a queue of robot autonomous guided vehicles on a side of the collaborative zone and commands the multiple robot autonomous guided vehicles disposed to load or unload the corresponding truck to move in autonomous mode into the queue.

21 Claims, 11 Drawing Sheets

(51) Int. Cl.
  *G05D 1/00*     (2006.01)
  *B65G 1/137*    (2006.01)
  *G06Q 10/08*    (2012.01)
(52) U.S. Cl.
  CPC ......... *G05D 1/0027* (2013.01); *G05D 1/0088* (2013.01); *G06Q 10/087* (2013.01); *G05B 2219/40298* (2013.01); *G05D 2201/0216* (2013.01)
(58) Field of Classification Search
  CPC ........... G05B 2219/31002; G05B 2219/40298; G05D 1/0027; G05D 1/0088; G05D 2201/0216; G06Q 10/087; Y02P 90/02
  See application file for complete search history.

(56) References Cited

U.S. PATENT DOCUMENTS

| | | | |
|---|---|---|---|
| 2006/0155406 A1 | 7/2006 | Rossi et al. | |
| 2012/0239224 A1* | 9/2012 | McCabe | B66F 9/063 |
| | | | 701/2 |
| 2016/0132059 A1 | 5/2016 | Mason et al. | |
| 2017/0253441 A1* | 9/2017 | Cooper | B66F 9/146 |
| 2020/0002094 A1* | 1/2020 | Schedlbauer | B65G 1/1375 |

OTHER PUBLICATIONS

Correa et al. Mutltimodal interaction with an autonomous forklift. Mar. 5, 2010. [retrieved on Nov. 19, 2019], Retrieved from the internet: <URL: https://www.ttic.edu/ripl/publications/correa10.pdf> entire document.

* cited by examiner

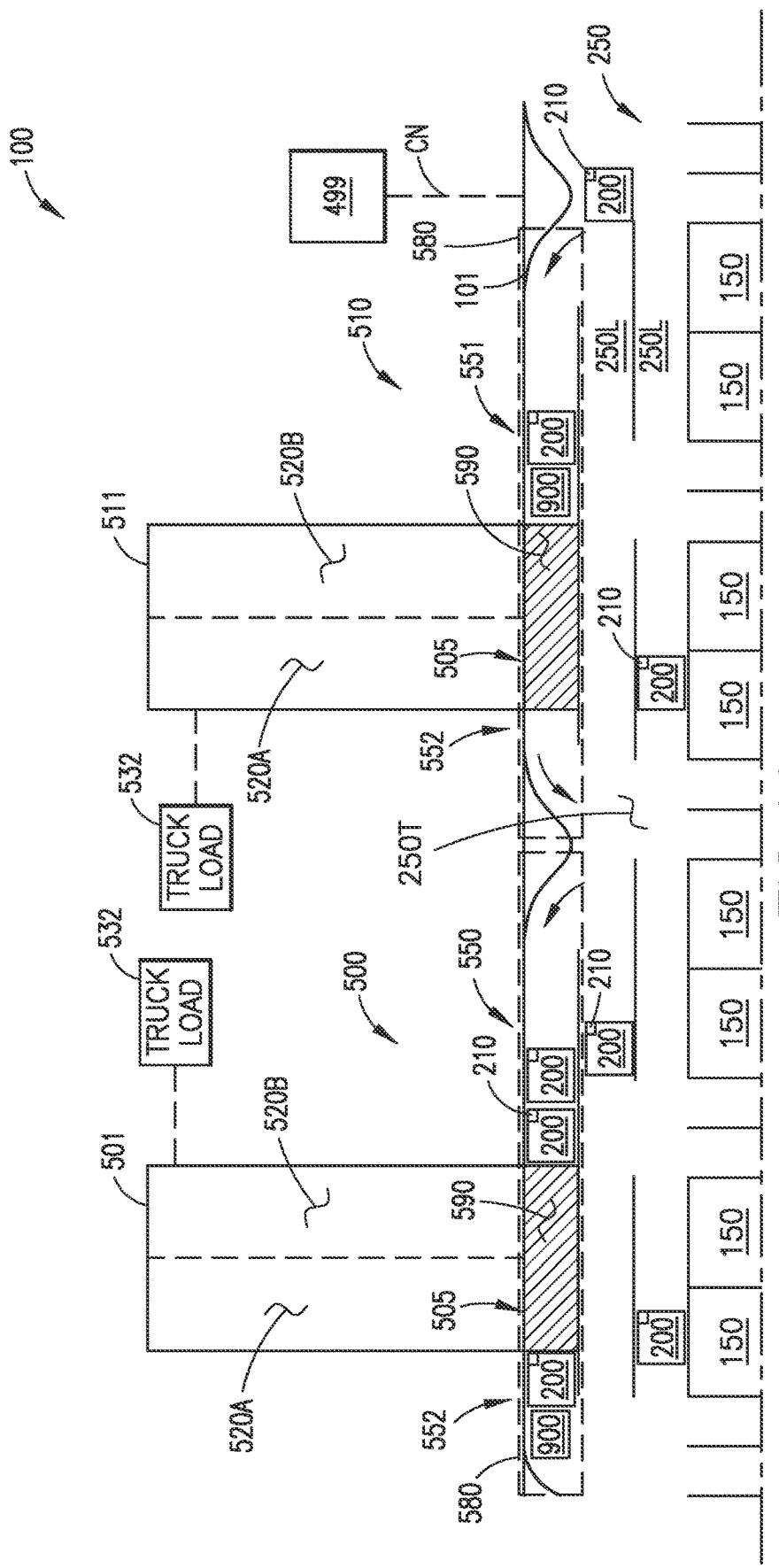

COLLABORATIVE AUTOMATION LOGISTICS FACILITY

CROSS-REFERENCE TO RELATED APPLICATIONS

This patent application is a non-provisional of and claims the benefit of U.S. provisional patent application No. 62/738,800 filed on Sep. 28, 2018 entitled "A COLLABORATIVE AUTOMATION LOGISTICS FACILTY", the disclosure of which is incorporated herein by reference in its entirety.

BACKGROUND

1. Field

The exemplary embodiments generally relate to automated logistic facilities, and more particularly, to collaborative transportation of logistic goods in automated facilities.

2. Brief Description of Related Developments

Generally, there are many conventional automated transportation and storage systems that utilize autonomous guided vehicles to maintain warehouse facilities and transport goods between two or more locations within the facility. In general, the large quantities of goods being shipped and received at these warehouse facilities demands that a significant portion of the facility be dedicated not only to storage but also to the transport operation which requires numerous truck docking bays and the associated floor space for loading and unloading goods to the transport vehicles.

The conventional warehouse facilities usually employ autonomous guided vehicles to deliver palletized goods from production to storage and also to retrieve palletized goods from inventory and deliver them to picking stations. The goods are picked by human pickers before a forklift operator loads the picked pallets into transport vehicles (e.g., trucks) while the autonomous guided vehicles return to inventory to retrieve additional palletized goods.

It would be advantageous to have a collaborative facility and method which reduces the necessity and dedicated floor space for pickers and additional manual driven forklifts by collaboratively loading trucks at loading bays directly carried on the autonomous guided vehicles that retrieved the goods.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1B:
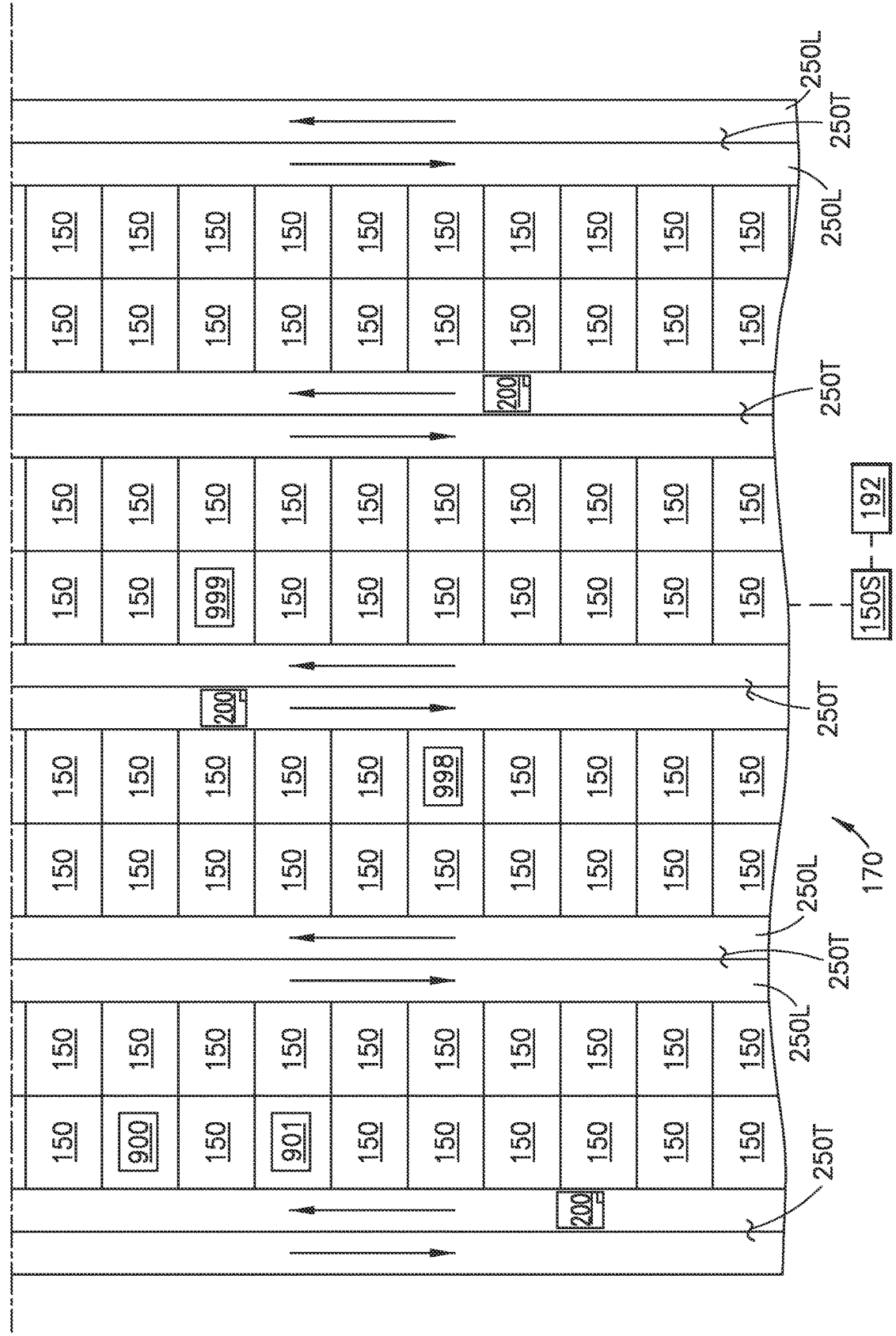
FIG. 1 is a schematic top plan view of a logistic facility in accordance with aspects of the disclosed embodiment.

FIG. 1 is a schematic illustration of a logistic facility 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape, or type of elements or materials could be used.

Referring to FIGS. 1, 2A, 2B, and 2C, as will be described in greater detail below, the aspects of the disclosed embodiment provide for the logistic facility 100 being configured for shipping and/or receiving logistic units 900, where each the logistic unit 900 includes one or more logistic good 901 (e.g., carton, container, etc). The logistic facility includes robot autonomous guided vehicles (hereinafter robots 200) that handle the logistic units 900 in a collaborative manner with human operators 299 (FIG. 3). Generally, the logistic facility 100 may be a warehouse, store, storage facility, production facility, or any other suitable facility for storing and shipping logistic units 900, and that has robotic automation, such as robots 200, to handle the logistic units 900 in collaborative fashion with the human operators 299 in the logistic facility 100.

Figure 4:
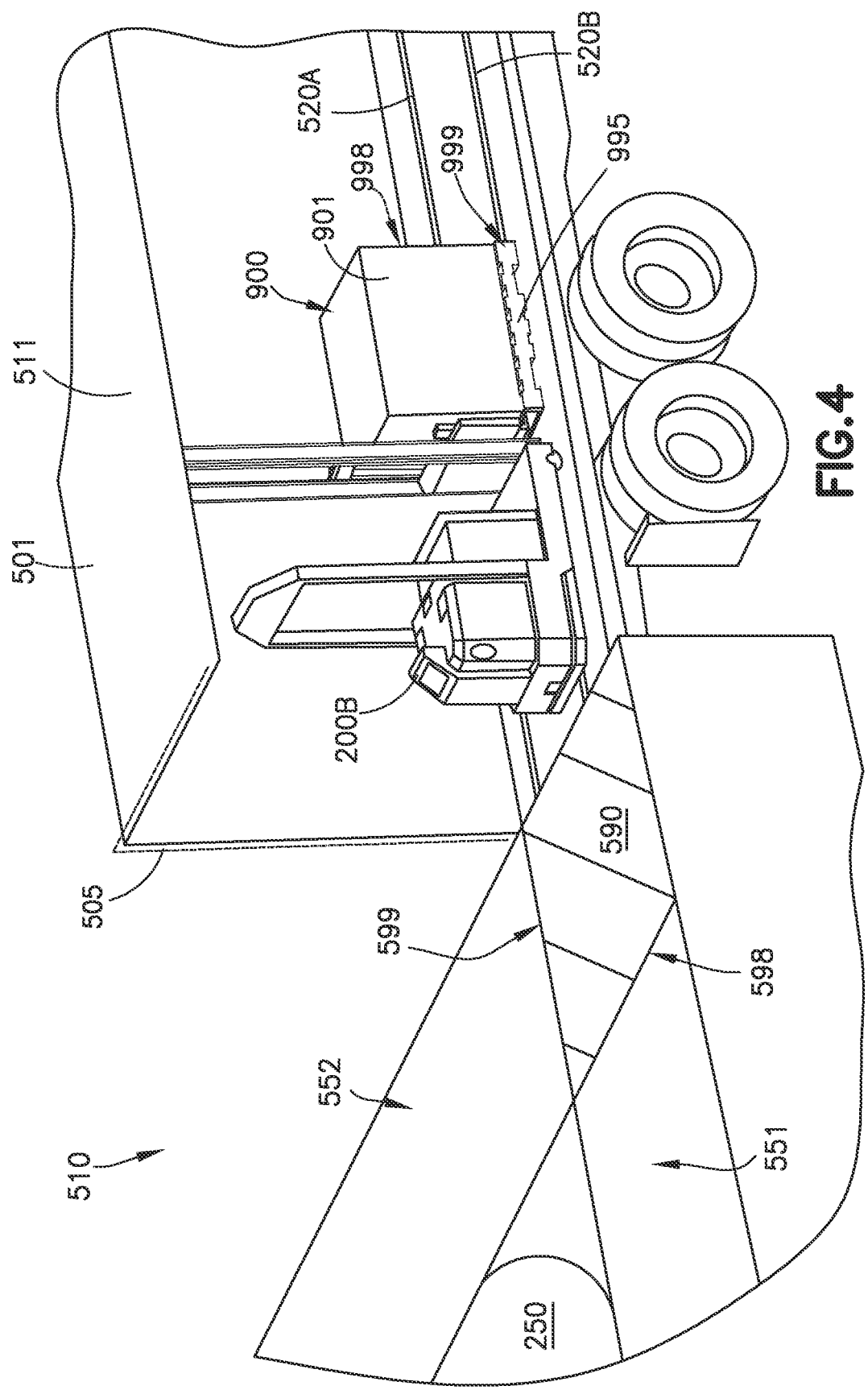
FIG. 4 is a schematic perspective view of a portion of the logistic facility of FIG. 1 in accordance with aspects of the disclosed embodiment.

In one aspect, referring also to FIG. 4, the logistic facility 100 may be a production or manufacturing facility that produces the logistic goods 901, that are packaged or unpackaged, and prepares the logistic goods 901 for shipping, in logistic units 900. The logistic units 900 may be arranged in any suitable manner for shipping, such as being placed or otherwise stacked on pallets 995 (or in other aspects in shipping/cargo containers) so as to form outbound pallet loads 998. These outbound pallet loads 998 include one or more pallets 995 on which the logistic units 900 are located where the outbound pallets loads 998 are formed by the robots 200 within the logistic facility 100, transported to an outbound truck bay 500, loaded into an outbound truck 501 (e.g., box truck or trailer) in a collaborative manner, and shipped as will be further described below.

In another aspect, the logistic facility 100 may be a storage facility where inbound pallet loads 999 are received from an inbound truck 511 at an inbound truck bay 510 (the terms port, portal, and bay being used interchangeably herein). It is noted that the truck bays 500, 510 are disposed at predetermined locations along walls (such as the outermost walls 101) of the logistic facility 100. The inbound pallet loads 999 may be substantially similar to the outbound pallet loads 998 and include one or more logistic units 900 located on and carried by one or more pallets 995. The inbound pallet loads are offloaded from the inbound truck 511 in a collaborative manner and stored in facility stores 170 (as inbound pallet loads 999 or unpalletized (packaged or unpackaged) logistic units 900 or logistic goods 901).

In still other aspects, the logistic facility 100 may be a facility in which items are both shipped and received. As such, the logistic facility incorporates both the inbound truck bay(s) 510 and outbound truck bay(s) 500. Here, the inbound pallet loads 999, logistic units 900 or logistic goods 901 disposed in the facility stores 170 (e.g., such as in storage spaces 150 defined on a floor of the logistic facility 100 or provided in multi-level racks) may subsequently be retrieved as outbound pallet loads 998 and transported by the robots 200 to a corresponding outbound bay 500 for placement into outbound trucks 501 and shipped. It is noted that although the truck bays 500, 510 are described herein as outbound bays 500 and inbound truck bays 510, each bay 500, 510 may accommodate both inbound trucks 501 and outbound trucks 511 and operate in a substantially similar, but opposite (i.e., loading/unloading) manner for both the outbound trucks 511 and inbound trucks 501 as each truck bay 510, 511 includes features that are substantially similar to a conventional truck loading dock for interfacing with the trucks 501, 511 while incorporating aspects of the disclosed embodiment. The inbound bay 510 and the outbound bay 510 may each be referred to as a "truck bay".

As noted above, loading of outbound pallet loads 998 into the outbound trucks 501 and unloading of inbound pallet loads 999 from the inbound trucks 511 is effected in collaborative manner between the robots 200 and the human operators 299 through a facility management system 499 that commands robot travel and disposes the robots 200 into queues 550, 551 for collaborative loading of the outbound pallet loads 998 into the outbound trucks 501 and unloading of the inbound pallet loads 999 from the inbound trucks 511. The robots 200 are queued by the facility management system 499 in one of a loading/outbound bot queue(s) 550 and an unloading/inbound bot queue(s) 551 depending the robot 200 being commanded to load an outbound pallet load 998 onto outbound truck 501 or unload an inbound pallet load 999 from inbound truck 911. The loading bot queue(s) 550 and the unloading bot queue(s) 551 are located alongside, or near the corresponding truck loading and unloading portals 505 of the truck bays 500, 510, where the loading bot queue(s) 550 and the unloading bot queue(s) 551 provide access from the facility stores 170 of the logistic facility 100 to the truck bays 500, 510 for loading and unloading as will be described.

Referring again to FIG. 1, the logistic facility 100 generally includes storage locations 150, the robots 200, a travel space 250 (i.e., transport aisles 250T and travel lanes 250L lanes for robot 200 travel), the truck portals 505, and truck bay(s) 500, 510 corresponding to a respective truck portal 505. The queues 550, 551 are disposed, offset from other travel lanes 250L across the truck portals 505, proximate walls 101 of the logistic facility 100 forming the truck portals 505.

The storage locations 150 are distributed or arrayed as desired inside the logistic facility 100 and configured so that the robots 200 pick and/or place the logistic goods 901 (as logistics units 900 that are palletized loads or unpalleted loads). For example, the storage locations 150 may be distributed in a single level two-dimensional distribution (such as in rows or a grid as illustrated in FIG. 1), in a three-dimensional distribution with multiple levels (such as in rows or columns 270 and arranged on multi-level racks 280—see FIG. 2D), and/or in an array that includes both single level and multi-level distributions (such as where some logistic goods 901 are stored in a single level storage on a floor of the logistic facility 100 while other logistic goods 901 are stored in a multi-level storage in the multi-level racks 280).

In one aspect, one or more of the storage locations is configured at least for pallet load 998, 999 storage and/or handling. For example, the one or more of the storage locations 150 may be a palletizing/depalletizing station that includes a palletizing apparatus (e.g., a palletizer and/or depalletizer) that palletizes or depalletizes the logistic goods 901 to/from pallets 995, where the logistics goods 901 being palletized are retrieved in any suitable manner from any suitable storage 192 and the logistics goods 901 being unpalletized are transported in any suitable manner to any suitable storage 192.

The travel space 250 may be formed of transport aisles 250T that are disposed adjacent the storage locations 150 so as to form a grid (e.g., in a grid wise manner) with the storage locations 150 (see FIG. 1). In one aspect, the transport aisles 250T include more than one travel lane 250L so as to provide bidirectional travel of two or more robots 200, past one another, in a common transport aisle 250T. In other aspects, the transport aisles 250T may have a single travel lane 250L in a transport aisle 250T for unidirectional travel of the robots 200. The travel space 250 communicably couples the storage locations 150 of the logistic facility 100 with the truck portals 505 and thus, the truck bays 500, 510. The travel space 250 may be arranged to provide passage of the robots 200 throughout the logistic facility 100 from each truck portal 505 to each storage location 150.

Referring now to FIGS. 1 and 2A-2D, in one aspect, the robots 200 are configured so as to be fully autonomous and independently guided so as to freely travel throughout the travel space 250. A suitable example of the robot 200 is the MAX N10 (produced and distributed by AutoGuide LLC). In one aspect, the robot 200 may have a modular platform including an automated guided vehicle module 201 to which various logistical components may be coupled so as to configure the robots 200 into various forms as described in U.S. Provisional Patent Application Ser. No. 62/738,697 filed on Sep. 28, 2018 and described in entitled "Configurable Modular Robotic Autonomous Guided Vehicle" and filed coincidently herewith, the disclosures of which are incorporated herein by reference in their entireties. For example, the modular robot 200 may be configured into a tugger 200A (FIG. 2A that tows or pushes the logistic goods 901 on a mobile platform or truck 231), a pallet stacker fork lift 200B (FIG. 2B that has a pallet lift with a height for stacking at least two pallet loads 998, 999 on top of each other), an extended pallet fork 200C (FIG. 2C that has an extended fork system for transporting two or more pallet loads), or a high bay lift 200D (FIG. 2D that has a pallet lift with a height for placing logistic goods 900 or pallet loads 998, 999 in storage locations 150 that on multi-level racks 280, i.e., located at heights exceeding ground level). In other aspect, the robot 200 may be any other suitable automated guided vehicle configured to transport logistic goods 901 from locations of origin to locations of destination.

Each of the robots 200 includes one or more suitable sensors 271 and a robot controller 210 carried by the robot 200 (i.e., a local controller). The sensors 271 may include one or more of LIDAR sensors 271A, infrared sensors 271B, GPS sensors 271C, range finding sensors 271D, encoders 271E, CCD (charge coupled device) sensors 271F, CMOS (complementary metal-oxide-semiconductor) sensors 271G or any other suitable sensor(s) coupled to the robot controller 210 that enables or otherwise configures the robots 200 for one or more of object/obstacle detection, ranging finding, autonomous navigation, and robot pose determination (e.g., with respect to a spatial reference frame of the robot, such as for positioning forks or cargo carried by the robot, and/or logistic facility 100) and for effecting autonomous navigation and travel of the robots 200 from one location to another location within the logistic facility 100. The robot controller 210 of each robot 200 is configured (e.g., programmed with) any suitable navigation software for determining, with sensors signals obtained from the sensors 271, a position/pose of the robot 200 and issues commands to one or more drive systems 213 of the robot 200 to effect one or more of picking/placing logistic goods 901 and autonomous navigation of the robot 200 from one location in the travel space 250 of the logistic facility 100 to another location in the travel space 250 of the logistic facility 100.

Figure 2A:
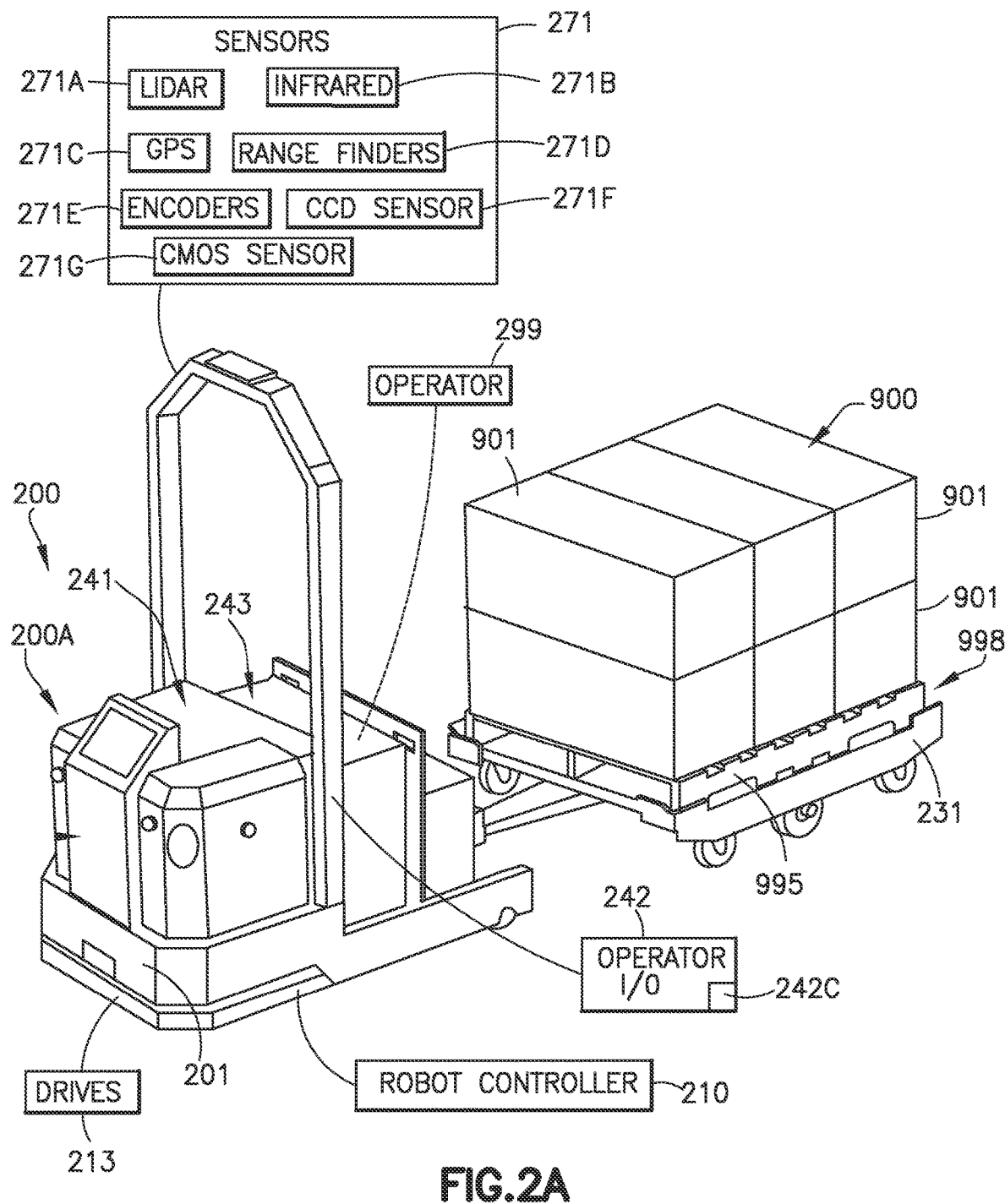
FIG. 2A is a perspective view of an exemplary robot autonomous guided vehicle in accordance with aspects of the disclosed embodiment.
Figure 2B:
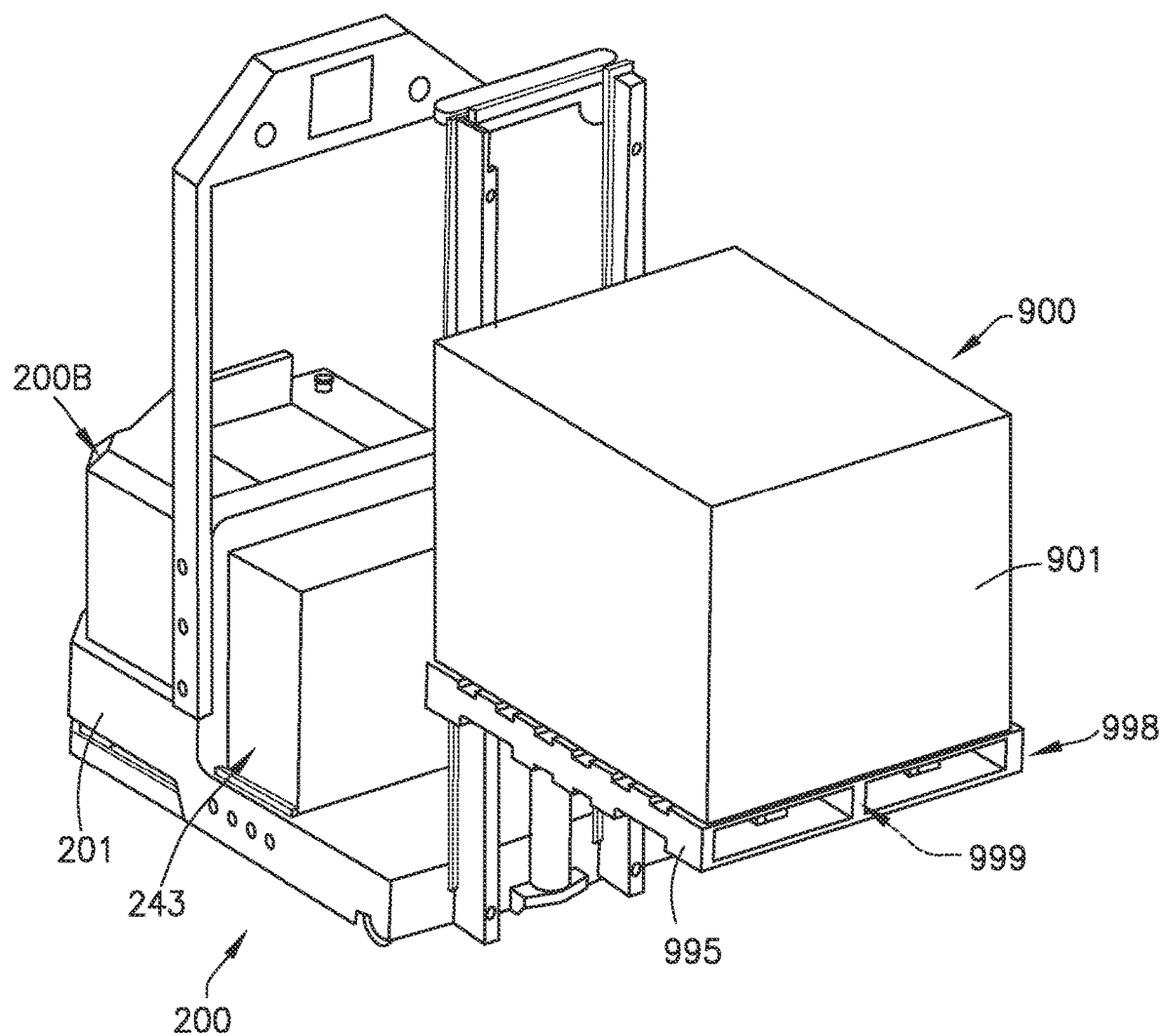
FIG. 2B is a perspective view of an exemplary robot autonomous guided vehicle in accordance with aspects of the disclosed embodiment.
Figure 2C:
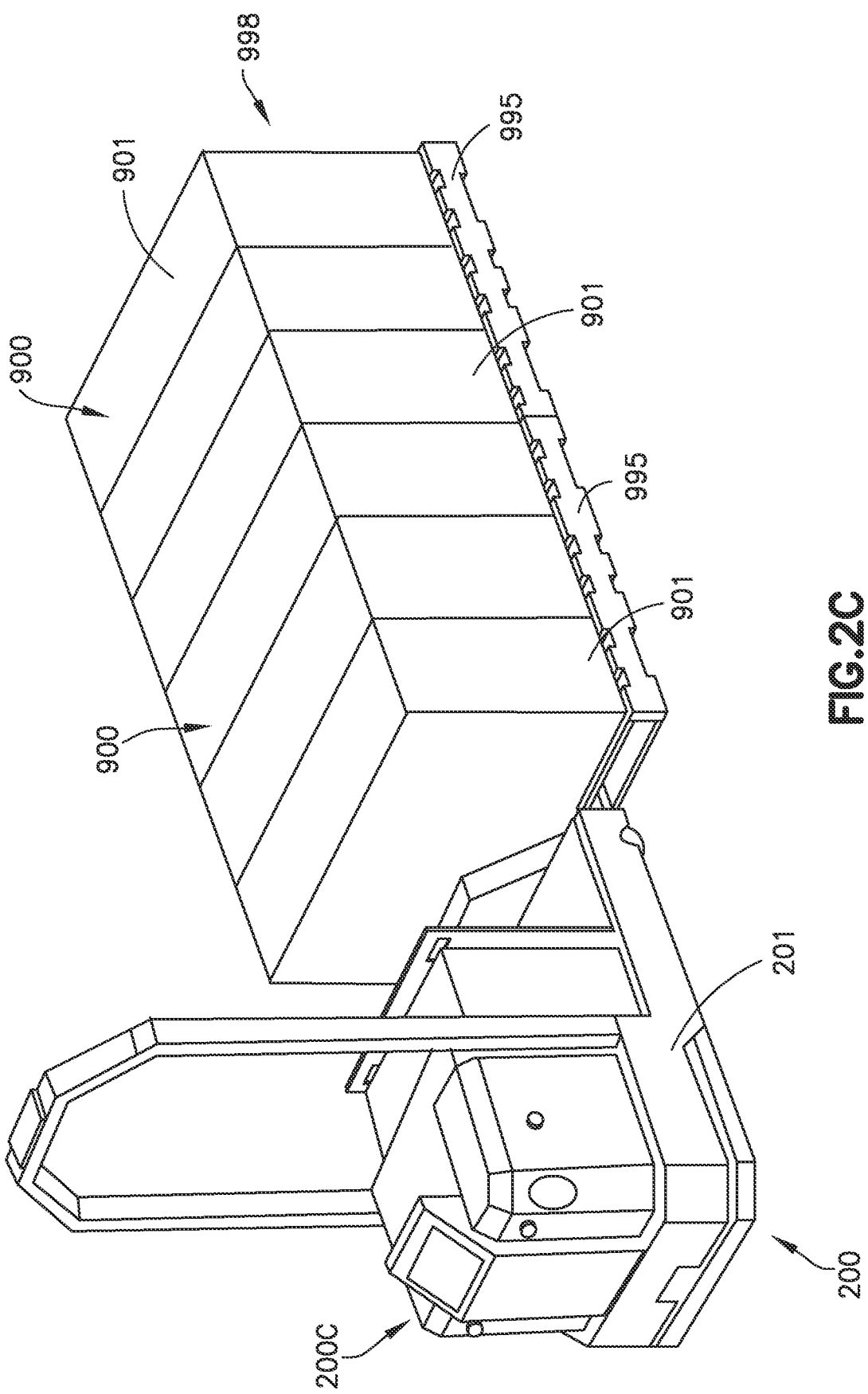
FIG. 2C is a perspective view of an exemplary robot autonomous guided vehicle in accordance with aspects of the disclosed embodiment.
Figure 2D:
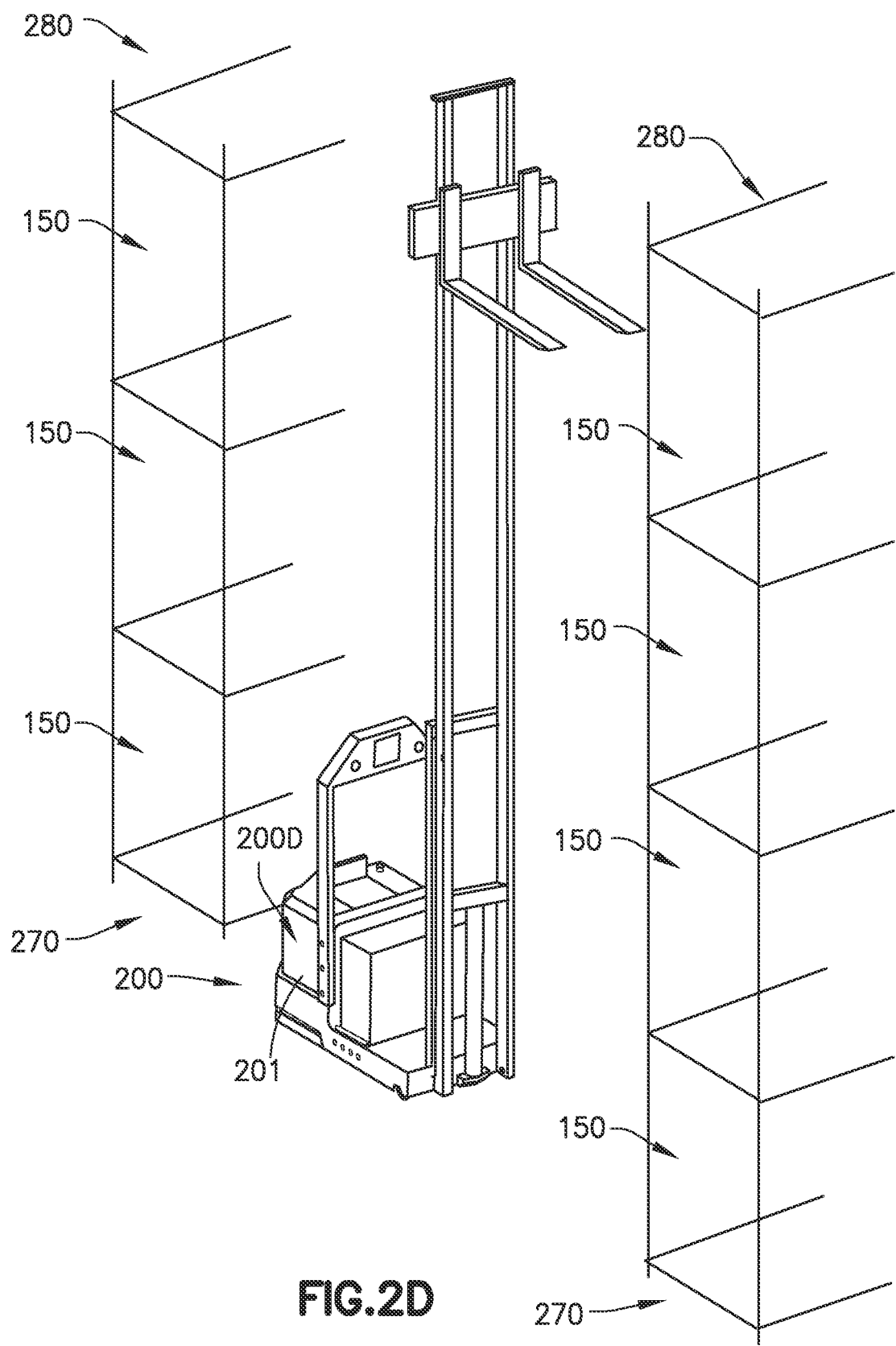
FIG. 2D is a perspective view of an exemplary robot autonomous guided vehicle in accordance with aspects of the disclosed embodiment.
Figure 3:
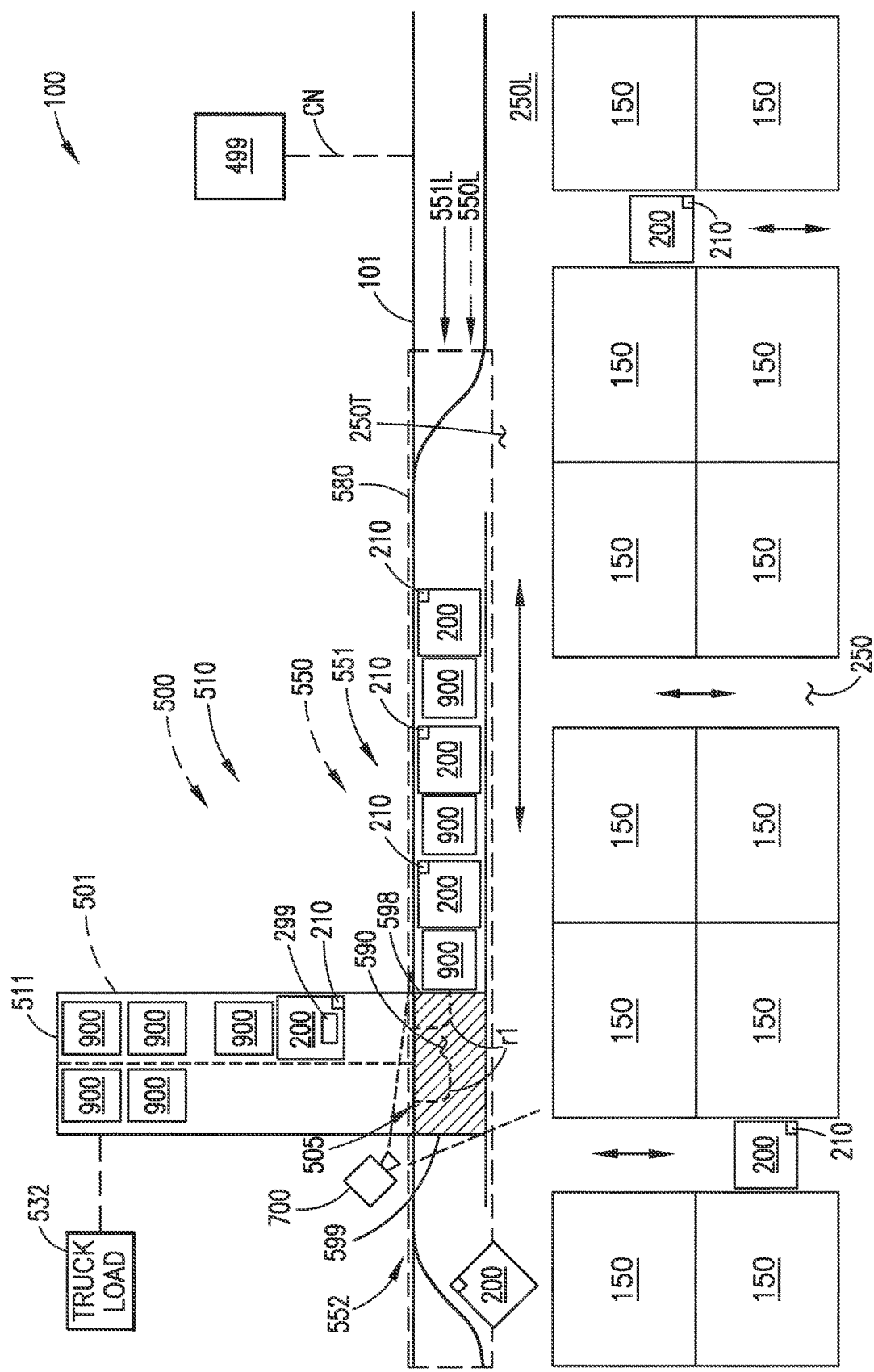
FIG. 3 is a top plan view of a portion of the logistic facility of FIG. 1 in accordance with aspects of the disclosed embodiment.

In the aspects of the disclosed embodiment, referring to FIG. 2A for exemplary purposes, the robots 200 described herein are intrinsically configured for wholly autonomous navigation. The robots also include a manual operating facility 241 for adding an operator input/output (I/O) 242 configured so as to switch the robot 200 from an autonomous operation mode to a manual operation mode. The operator input/output 242 may be a module that is removably coupled to the robot 200 in any suitable manner (such as with removable fasteners and electrical couplings), while in other aspects operator input/output 242 is permanently coupled to the robot 200. The operator input/output 242 includes any suitable operator controls 242C that provide for, in the manual operation mode, operator control of any suitable operational functionality of the robot 200. For example, in manual operation mode the operator controls 242C provide for direct operator control for one or more of steering/navigating the robot 200 (e.g., through at least a portion of the travel space 250 and within at least a portion of the transport vehicle located at a truck bay 500, 510) and picking and placing logistic goods 901 (e.g., at least within the portion of the transport vehicle located at the truck bay 500, 510). Each robot 200 includes an operator control area 243 configured to provide an occupancy location for an operator 299 onboard the robot 200 where the operator controls 242C are positioned on the robot 200 so as to be accessed from the operator control area 243.

Referring again to FIGS. 1 and 2A, the logistic facility 100 further includes the warehouse management system or system controller 499. The system controller 499 is communicably coupled (via any suitable communication network CN) at least to the robots 200. The system controller 499 is configured to command autonomous robot travel in the travel space 250 so that the robots 200 travel from locations of origin to locations of destination. For example, commands for transporting logistic goods 901 may be entered into the system controller 499 manually and/or from any suitable programmed system (e.g., an automated ordering/inventory system) for a robot 200 to travel to a specified/predetermined storage location 150 containing a specified/predetermined logistic good 901, and transport the specified logistic good 901 to a specified/predetermined outbound truck bay 500.

The system controller 499 is also programed (e.g., configured through suitable non-transitory computer program code) to configure the travel space 250. For example, the system controller 499 is configured to control/maintain the travel space 250 and establish/maintain open travel lanes for passage of the robots 200. As illustrated in FIG. 1, the system controller 499 may configure one or more transport aisles 250T so that each respective transport aisle 250T has one travel lane 250L or more than one travel lanes 250L. The system controller 499 may configure the transport aisles 250T so as to have one or more unidirectional travel lanes 250L (i.e., a transport aisle 250T may have a single lane along which the robots 200 unidirectionally travel (FIG. 3); or configured the transport aisles 250T so as to have more than one travel lane 250L providing travel in the same direction (FIG. 1)) or, in other aspects, the more than one travel lane 250L may be bidirectional (i.e., an aisle may have more than one travel lane 250L providing the robots 200 travelling in the respective transport aisle 250T with travel in opposite directions (FIG. 1)). As described herein the travel lanes 250L link the storage locations 150 to the truck portals 505 and to the bot queue(s) 550, 551.

Referring now to FIGS. 1, and 3-5, each truck portal 505 defines an interface between a truck 501, 511 in a truck bay 500, 510 and the travel space 250. The system controller 499 is configured to generate a predetermined collaborative zone 580 in at least part of the travel space 250 adjacent the truck portals 505. Each predetermined collaborative zone 580 is an autonomous mode robot interdiction zone 590. For example, robot 200 motions and load engagement/disengagement within the interdiction zone 590 is generally controlled directly by an operator 299; however, in other aspects some or all of the robot 200 motion and load actions may be fully or partially automated (i.e., with or without operator oversight). The predetermined collaborative zone 580 connects the respective queue 550, 551 to truck load space 520A, 520B through the respective truck portal 505 so that a robot 200 enters the truck load space 520A, 520B from the queue 550, 551 through the predetermined collaborative zone 580 in a collaborative operating mode.

The queue 550, 551 defines a collaborative interface where an operator 299 may engage with the robot 200 (e.g., mount or dismount the bot or engage suitable controls of the robot 200, such as remote controls, and work alongside the robot 200) and from the robot 200 is transitioned from the travel space 250 (under autonomous control) via the queue 550, 551 into lanes of the predetermined collaborative zone 580 (under manual control or quasi-manual control effected through the manual manipulation of the robot operator controls). In one aspect, the predetermined collaborative zone 580 is sized and shaped conformal to a truck load configuration; while in other aspects, the predetermined collaborative zone 580 may have ay suitable size and shape. The system controller 499 is programmed/configured to identify another side (e.g., the exit side) of the predetermined collaborative zone 580 from which the multiple robots 200, in collaborative mode, exit the truck 501, 511 and the predetermined collaborative zone 580. In response to operator 299 departure from the robots 200 the system controller 499 is programmed/configured to command autonomous mode travel of the robots 200 in the travel space 250 to a destination within the logistic facility 100.

The predetermined collaborative zone 580 is communicably coupled to one of the outbound robot queue 550 or an inbound robot queue 551 and to an exit lane 552 so that robots 200 may enter the predetermined collaborative zone 580 from a respective queue 550, 551 and exit the predetermined collaborative zone 580 to a respective exit lane 552. It is noted that each collaborative zones 580 may be dynamically defined by the system controller 499 based on a designation of an inbound flow of logistic goods 901 or an outbound flow of logistic goods 901 at the truck portal 505. For example, while truck bay 500 and robot queue 550 are respectively referred to herein as an outbound truck bay and an outbound robot queue, the system controller 499 may switch truck bay 500 and the robot queue 550 respectively to an inbound truck bay and an inbound robot queue such as when a truck 511 from which logistic goods 901 are to be unloaded docks with the truck bay 500. Each collaborative zone 580 is disposed at predetermined locations, generally along the outermost walls 101 of the logistic facility 100 (i.e., at the outermost portion of the logistic facility 100, in close proximity to the truck portals 505 and the trucks 501, 511 (which are to be loaded/unloaded) positioned outside the logistic facility 100 at the truck bays 500, 510).

The outbound robot queue 550 and inbound robot queue 551 form respective lanes are configured so that the robots 200 enter a respective queue 550, 551 so as to queue and interface with the truck portal 505. The robots 200 traverse from the robot queue 550, 551 through the truck portal 505 so as to enter the trucks 501, 511, engaging directly with the trucks 501, 511 to pick/place a respective pallet load 998, 999 (e.g., the logistic goods 901 being loaded outbound from or unloaded inbound to the logistic facility 100) to/from the trucks 501, 511. In one aspect, the outbound robot queue 550 and/or the inbound robot queue 551 includes one lane 550L, 551L (FIG. 3); while in other aspects, the outbound robot queue 550 and/or the inbound robot queue 551 includes two or more lanes 550L1, 551L1, 550L2, 551L2 (FIG. 5), which may be arranged in parallel. In one aspect, the outbound pallet loads 998 and/or robots 200 in the outbound robot queue 550 (or robots 200 in the inbound robot queue 551) are positioned and arranged (i.e., queued) substantially linearly (singly or stacked one above the other such as on different transport levels) along the respective lane(s) 550L, 551L, 550L1, 551L1, 550L2, 551L2 of a respective outbound robot queue 550 (or inbound robot queue 551) in an ordered sequence or an unordered (at least in part) sequence. In other aspects, the outbound pallet loads 998 and/or robots 200 in the outbound robot queue 550 (or robots 200 in the inbound robot queue 551) are positioned and arranged (i.e., queued) substantially linearly (singly or stacked one above the other such as on different transport levels) along the respective lane(s) 550L, 551L, 550L1, 551L1, 550L2, 551L2 of the respective outbound robot queue 550 (or inbound robot queue 551) in an order that corresponds to placement positions of the pallet loads 998 (or pallet loads 999) within the truck 501, 511 For example, the system controller 499 is programmed/configured to identify an order of the logistic goods 901 or pallet loads 998, 999 in a truck load (of the inbound or outbound truck), and to sort the robots 200 in the robot queue 550, 551 based on the order of the logistic goods 901 or pallet loads 998, 999 in the truck load.

As noted above, each queue 550, 551 may have single lane 550L, 551L, and ordered in sequence (e.g., according to the truck 501, 511 load/unload sequence); or in other aspects each queue 550, 551 may have more than one lane 550L1, 551L1, 550L2, 551L2 where each of the more than one lane 550L1, 551L1, 550L2, 551L2 corresponds to interior truck load space 520A, 520B inside the trucks 501, 511. Each lane 550L, 551L, 550L1, 551L1, 550L2, 551L2 is positioned so that the lanes 550L, 551L, 550L1, 551L1, 550L2, 551L2 provide optimal turn in radii r1, r2 respectively to each interior truck load space 520A, 520B within the trucks 501, 511. In one aspect, the system controller 499 is programmed to sort the robots 200 in the queue 550, 551 according to a truck load fill sequence or, on other aspect, sort the robots 200 in the queue 550, 551 in any suitable manner.

Still referring to FIGS. 1 and 3-5, and as described herein the queue of the robots 200 in the respective outbound/inbound robot queue lanes 550L, 551L, 550L1, 551L1, 550L2, 551L2 defines a collaborative interface between each robot 200 and the operator 299. The operator 299 may engage with the robots 200 as described herein and directly control the robots 200 motions and pallet load engagement (pick/place) within the trucks 501, 511 in a collaborative operating mode. For example, the operator 299 may engage the robot 200 so as to control the robot 200 from onboard the robot 200 and/or work alongside the robot 200 transitioning from the travel space 250 (i.e., where the robot 200 is under autonomous control) to the outbound/inbound robot queue lanes 550L, 551, 550L1, 551L1, 550L2, 551L2 and into the trucks 501, 511 (under manual or quasi-manual control of the robot 200).

The location of the predetermined collaborative zones 580 at the truck portals 505 is programmed into the robot controller 210 of the robots 200; while in other aspects, the system controller 499 communicates the location of the predetermined collaborative zones 580 to the robot controller 210 in any suitable manner, such as through the communication network CCCN. and defines, as described herein, an interdiction zone 590 that may be sized corresponding to outbound/inbound robot queue lanes 550L, 551L, 550L1, 551L1, 550L2, 551L2 and the interior truck load space 520A, 520B) wherein which fully automated (i.e., without operator oversight or direct manipulation) motion of the robot 200 is disallowed or disabled. The dimensions of the interdiction zone 590 are programmed into system controller 499 of the logistic facility 100 and/or the robot controller 210 of the robot 200, for each corresponding truck portal 505. In other aspects, the system controller 499 may communication the dimensions of the interdictions zone 590 to the robot controller 210 in any suitable manner, such as through the communication network CN. The interdiction zone 590 provides for unencumbered access (i.e., free entry/exit) by the robots 200, under collaborative mode control of the operator 299, to the interior truck load space 520A, 520B within the trucks 501, 511 positioned at the corresponding truck bay 500, 510. Generally, each interdiction zone 590 has an inbound queue 598 (whether loading or unloading) disposed along one side, placing the queue 598 adjacent the truck portal 505 and the wall 101 of the logistic facility 100. The inbound queue may correspond with (so as to form an extension of) or include at least a portion of the queue(s) 550, 551

In one aspect, sensors 271 onboard the robots 200 may be configured to detect features delimiting or representative of the interdiction zone 590 and queue positions of the robots 200. For example, robot navigation sensors 271 that effect robot navigation throughout the logistic facility 100 based on inherent facility structure without special navigation markers (such as beacons, special indicia markings, lasers, lights, etc.) are programmed to sense and register the truck portal 505 and its structure within the robot controller 210. The system controller 499 registers dimensions, on a floor in the travel space 250, of the corresponding collaborative zone 580 and communicates those dimensions to the robot controller 210. In other aspects, the floor of the logistic facility 100 may include any suitable sensor(s), such as optical sensors, acoustic sensors, capacitive sensors, radio-frequency sensors, etc. to indicate to the robots 200 the location of interdiction zone 590 and where to stop for queuing and collaborative control. In other aspects, an imaging sensor such as a camera 600 (FIG. 5) may be positioned proximate to the interdiction zone 590 and the inbound queue 598 to detect a location of the robots 200 relative to or within the interdiction zone 590.

Referring still to FIGS. 1 and 3-5, each interdiction zone 590 of each corresponding truck portal 505 further includes an outbound exit 599 that forms part of or is communicably coupled to exit lane 552. The outbound exit 599 is on a side of the interdiction zone 590 opposite from the inbound queue 598. In other aspects, the outbound exit 599 may be on a side of the interdiction zone 590 perpendicular to the inbound queue 598 (FIG. 4) or have any other suitable spatial arrangement relative to the inbound queue 598. The outbound exit 599 defines another collaborative interface, where the operator 299 dismounts the robot 200 or otherwise relinquishes manual control of the robot and where the robot 200 returns to full autonomous control, proceeding to the next destination. As described herein, in response to operator departure from the robots 200 (as determined by any suitable sensors of the robot 200 (e.g., such as pressure sensors on the floor or seat area of the robot 200 and which the operator 299 occupies), operator input that departure is complete, and/or suitable sensors of the logistic facility 100 (such as camera 700)) the system controller 499 commands autonomous mode travel of the robots 200 in the travel space 250 to the destination. It is noted that in some aspects, the robot 200 may enter a travel lane in the travel space 250 before receiving a command/destination from the system controller 499 so as to free the exit lane 552 for subsequent operator 299 dismount from the next robot 200 in queue (i.e., after pallet load engagement or disengagement in the truck 501, 511). The dismounted operator 299 may then proceed to the next or another robot 200 in queue. In one aspect, the operator 299 may be alerted to which robot 200 is next in queue by any suitable indication, such as an indicator light, audible tone, etc. to load/unload the truck 501, 511 or the next robot 200 in queue may simply advance forward.

In one aspect, sensors onboard the robots 200 may be programed to detect robot exit from truck 501, 511 and/or robot exit from the interdiction zone 590. For example, robot navigation sensors 271 sense the robot exit through the portal 505 and entry onto the floor of the collaborative zone 580. In other aspects, the floor of the logistic facility 100 may include any suitable sensor, such as optical sensors, acoustic sensors, capacitive sensors, radio-frequency sensors, etc. to indicate to the robots 200 where the interdiction zone 590 ends and/or when the robot 200 is in the outbound exit 599. In other aspects, an imaging sensor such as a camera 700 (FIG. 3) may be positioned proximate to the interdiction zone 590 and the outbound exit 599 to detect the location of the robots 200.

Figure 5:
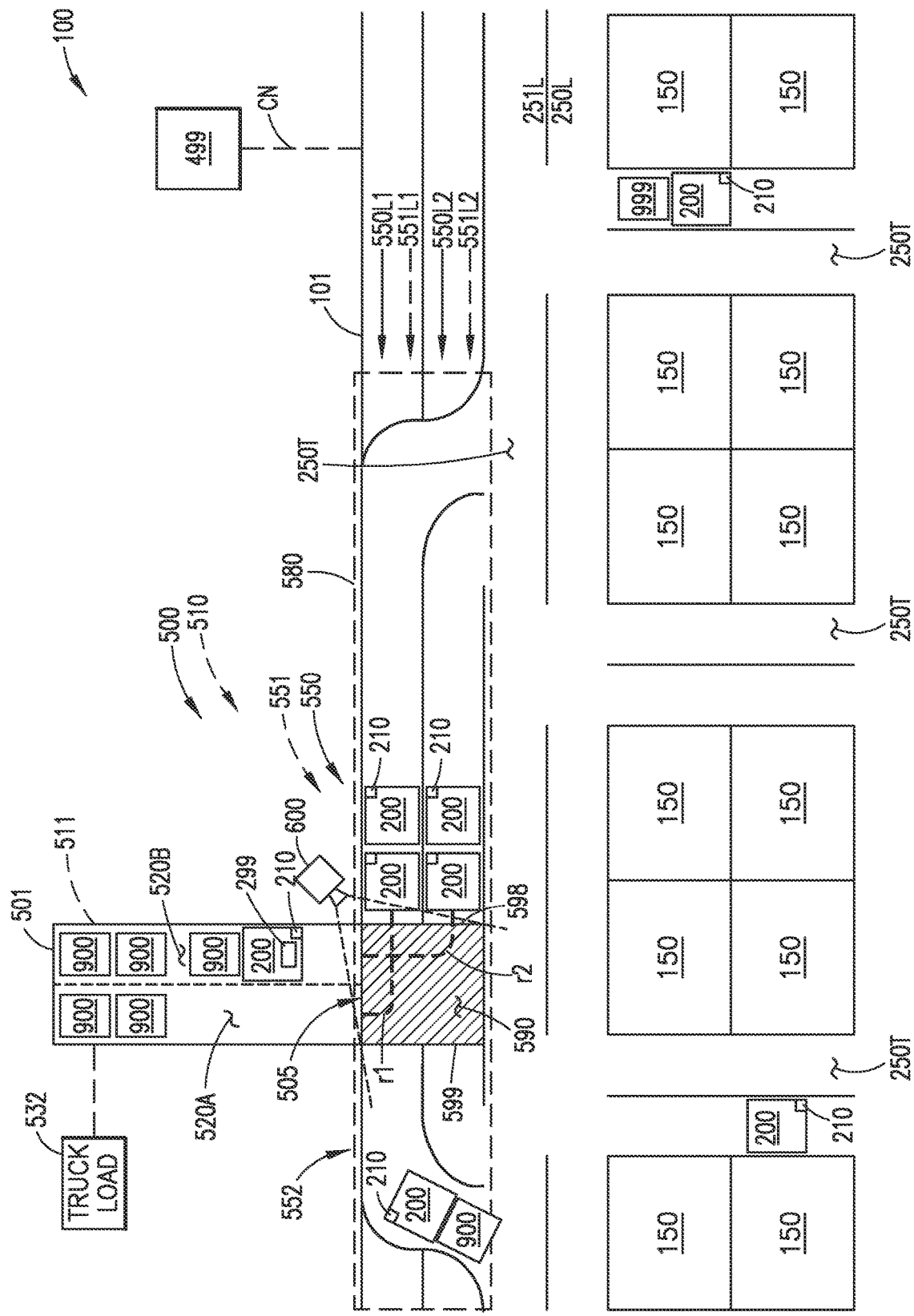
FIG. 5 is a top plan view of a portion of the logistic facility of FIG. 1 in accordance with aspects of the disclosed embodiment.
Figure 6:
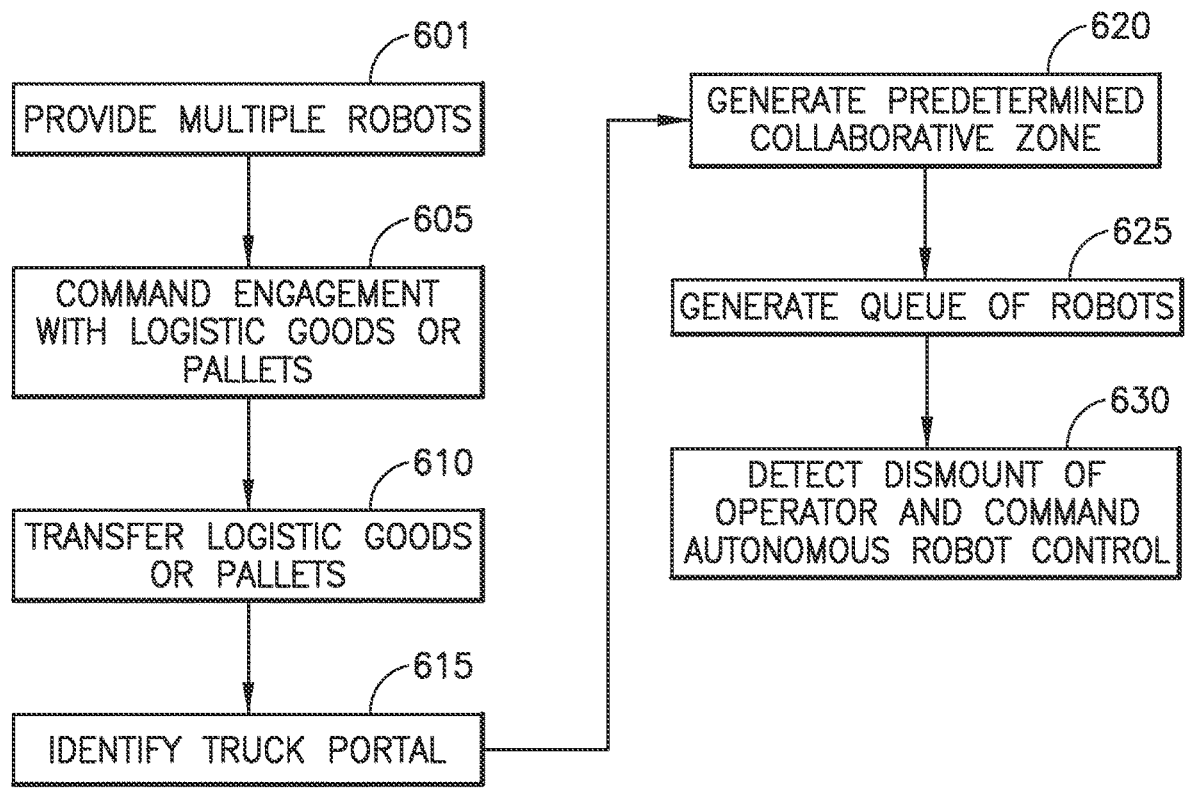
FIG. 6 is a method for loading and shipping goods from the logistic facility of FIG. 1 in accordance with aspects of the disclosed embodiment.

Referring now to FIGS. 1, 5, and 6, a method of loading a truck 501 will be described in accordance with aspects of the disclosed embodiment. Multiple robots 200 are provided (FIG. 6, Block 601) in the logistic facility 100. When a specified order is received at the logistic facility 100 for shipping, generally, the system controller 499 commands the robots 200 to engage with the logistic goods 901 or pallet loads 998 (on which logistics good(s) 901 forming logistic unit(s) 900 are carried) (FIG. 6, Block 605). For example, the system controller 499 indicates to multiple various robots 200 which logistic goods 901 or pallet loads 998 are to be retrieved for loading onto a designated truck 501. The robots 200 autonomously travel to a predetermined location provided by the system controller 499 (i.e., the location of the respective logistic good 901 stored in the respective storage location 150 and to be loaded onto the truck 501). The robots 200 transfer the logistic goods 901 or pallet loads 998 (FIG. 6, Block 610) between the truck portals 505 and the storage locations 150. The system controller 499 identifies a predetermined truck portal 505 (FIG. 6, Block 615) of a corresponding truck 501 to be to be loaded with logistic goods 901 or pallet loads 998 from the storage locations 150 (FIG. 6, Block 615). The system controller 499 generates a predetermined collaborative zone 580 (FIG. 6, Block 620) in the at least part of the travel space 250 adjacent the identified truck portal 505.

The system controller 499 generates a queue of robots 200 on a side of the predetermined collaborative zone 580 (FIG. 6, Block 625) and commands the robots disposed to load the corresponding truck 501 to move in autonomous mode into the queue. With the retrieved logistic good(s) 901 (either packaged or loaded on an outbound pallet load 998) onboard the robots 200, the robots 200 travel to queue in the outbound robot queue 550 positioned adjacent to the truck portal 505 at truck bay 500, corresponding to outbound truck 501. In generating the queue at the truck portal 505 of the truck bay 500, the system controller 499 commands the robots 200 to be sorted in a predetermined order (such as based on the truck load order) while in transit to the truck bay 500, such as before queuing up in the outbound robot queue 550. The robots 200 in the outbound robot queue 500 remain clear of (i.e., outside of) the interdiction zone 590 and await operator interface (e.g., such as the boarding of an operator 299 on the robot 200 or an operator otherwise taking control of at least part of the movements of the robot 200). After loading the logistic goods 900 onto the truck 501 with the robots 200 in manual operation mode, under direct control of an operator 299, each robot 200 (or other suitable sensor of the logistic facility 100) detects dismount of the operator 299 (e.g., disconnect from the operator controls and/or physical dismount) and/or detection of position in the exit lane 552 (FIG. 6, Block 630), where upon detection of operator dismount the robots 200 revert back to (e.g., under command of the robot controller 210 and/or the system controller 499) fully autonomous operation and exit from the exit lane 552 commencing autonomous travel to a commanded destination. It is noted that Blocks 601-630 of FIG. 6 may be repeated until the truck 501 and/or the specified order is full.

Figure 7:
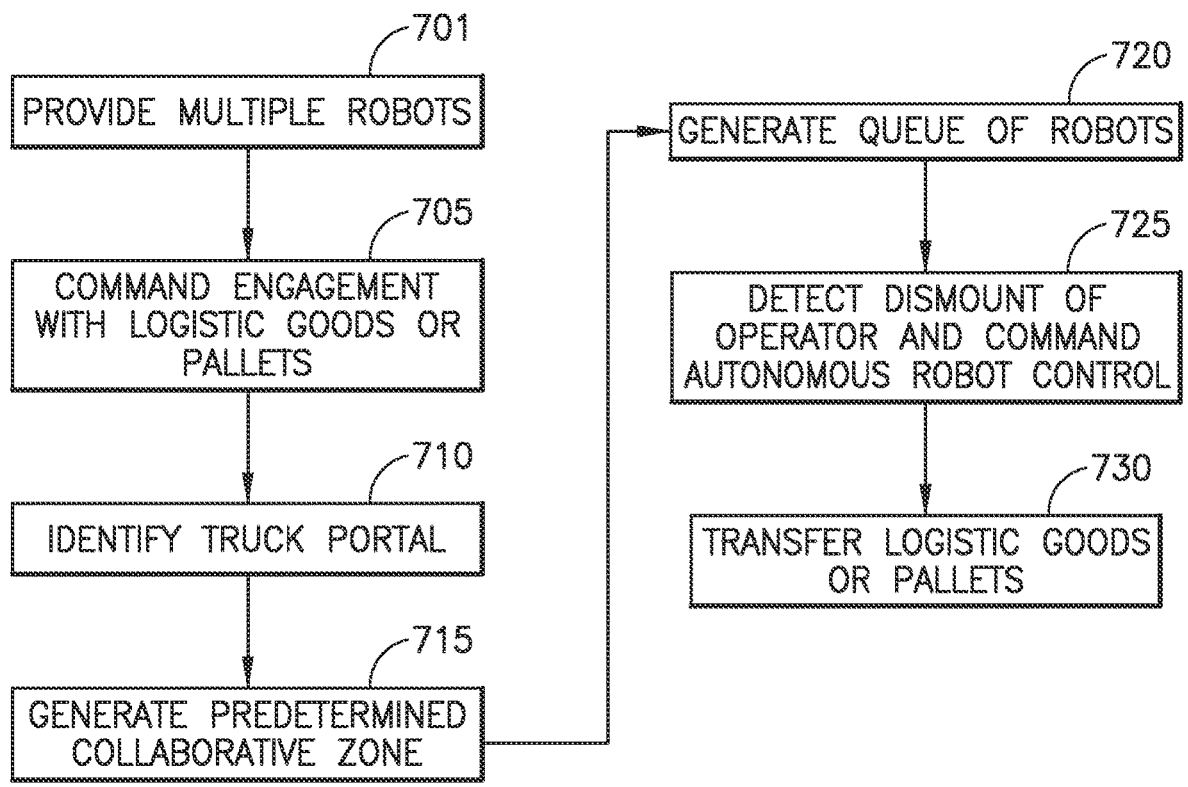
FIG. 7 is a method for unloading and storing goods into the logistic facility of FIG. 1 in accordance with aspects of the disclosed embodiment.

Referring now to FIGS. 1, 3-4, and 7, a method for unloading a truck 511 will be described in accordance with aspects of the disclosed embodiment. Multiple robots 200 are provided (FIG. 7, Block 701) in the logistic facility 100. When unloading a truck 511 at inbound truck bay 510, the system controller 499 commands the robots 200 to engage with the logistic goods 901 or pallets loads 999 (on which logistics good(s) 901 forming logistic unit(s) 900 are carried) (FIG. 7, Block 705_). The system controller 499 identifies a predetermined truck portal 505 (FIG. 7, Block 710_ of a corresponding truck 511 to be unloaded so as to transfer logistic goods 901 or pallet loads 999 to the storage locations 150. The system controller 499 generates a predetermined collaborative zone 580 (FIG. 7, Block 715) in at least part of the travel space 250 adjacent the identified truck portal 505 and generates a queue 551 of robots 200 on a side of the predetermined collaborative zone (FIG. 7, Block 720). The system controller 499 commands the robots 200 disposed to unload the corresponding truck 511 to move in an autonomous operating mode into the queue 551. For example, the system controller indicates to multiple various robots 200 which inbound robot queue 551 to travel to so as to be positioned in queue adjacent the truck portal 505 at the truck bay 510, corresponding to a designated inbound truck 511.

In generating the queue at the truck portal 505 of the truck bay 510, the system controller 499 commands the robots 200 to queue up, remaining clear of the interdiction zone 590, and await operator interface (e.g., such as the boarding of an operator 299 on the robot 200 or an operator otherwise taking control of at least part of the movements of the robot 200). The logistic goods 900 are unloaded from the truck 511 with the robots 200 in manual operation mode, under direct control of an operator 299. With the logistic goods 901 or pallet loads 999 onboard the robots 200 and after removing the logistic goods 901 or pallet loads 999 from the truck 511, each robot 200 (or other suitable sensor of the logistic facility 100) detects dismount of the operator 299 (e.g., disconnect from the operator controls and/or physical dismount) and/or detection of position in the exit lane 552 (FIG. 7, Block 725), where upon detection of operator dismount the robots 200 revert back to (e.g., under command of the robot controller 210 and/or the system controller 499) fully autonomous operation and exit from the exit lane 552 commencing autonomous travel to a commanded destination. The system controller 499 commands the robots, in the fully autonomous operating mode, to transfer the logistic goods 901 or pallet loads 999 (FIG. 7, Block 730) between the truck portals 505 and the storage locations 150. For example, the system controller 499 provides the robots 200 with a storage location 150 where each respective logistic good 901 or pallet load 999 is to be stored and each robot 200 commences autonomous travel to the identified storage location 150. It is noted that the destination of the offloaded logistic goods 901 and/or pallet loads 999 may be predetermined and provided to the robot 200 before queuing up so that once the operator 299 dismounts, the robot 200 substantially instantly begins travel to the destination. Blocks 701-730 of FIG. 7 may be repeated until the truck 511 is empty.

In accordance with one or more aspects of the disclosed embodiment a collaborative logistic facility management system for a logistic facility including storage locations for logistic goods or pallets, truck load or unload portals, and a travel space distributed through the logistic facility and communicably connecting the storage locations and truck load or unload portals for transfer of the logistic goods or pallets therebetween. The collaborative logistic facility management system includes:

multiple robot autonomous guided vehicles disposed so as to engage with and transport the logistics goods or pallets between truck portals and storage locations, the multiple robot autonomous guided vehicles being configured for autonomous guidance travel, in autonomous mode, throughout the travel space from each truck portal to each storage location, and including a collaborating operator input for collaborative autonomous guided vehicle navigation and guidance through at least part of the travel space in a collaborative mode, and a system controller communicably coupled to each of the multiple robot autonomous guided vehicles and programmed to command each of the multiple robot autonomous guided vehicles to engage with the logistic goods or pallets and transfer the logistic goods or pallets between the truck portals and the storage locations, the system controller further being programmed to:

identify a predetermined truck portal of a corresponding truck to be loaded with logistic goods or pallets from storage locations or to be unloaded so as to transfer logistic goods or pallets to the storage locations, and generate a predetermined collaborative zone in the at least part of the travel space adjacent the identified truck portal, and generate a queue of robot autonomous guided vehicles on a side of the predetermined collaborative zone and command the multiple robot autonomous guided vehicles disposed to load or unload the corresponding truck to move in autonomous mode into the queue.

In accordance with one or more aspects of the disclosed embodiment the predetermined collaborative zone is an autonomous mode robot autonomous guided vehicle interdiction zone.

In accordance with one or more aspects of the disclosed embodiment the predetermined collaborative zone connects the queue to truck load space through the truck portal so that a robot autonomous guided vehicle enters the truck load space from the queue through the predetermined collaborative zone in collaborative mode.

In accordance with one or more aspects of the disclosed embodiment the predetermined collaborative zone is sized and shaped conformal to a truck load configuration.

In accordance with one or more aspects of the disclosed embodiment the collaborative logistic facility management system is programmed to identify an order of the logistic goods or pallets in the truck load, and to sort the multiple robot autonomous guided vehicles in the queue based on the order of the logistic goods or pallets in the truck load.

In accordance with one or more aspects of the disclosed embodiment the collaborative logistic facility management system is programmed to identify another side of the predetermined collaborative zone from which the multiple robot autonomous guided vehicles, in collaborative mode, exit the truck and the predetermined collaborative zone, and in response to operator departure from the multiple robot autonomous guided vehicles command autonomous mode travel of the robot autonomous guided vehicles in the travel space to a destination.

In accordance with one or more aspects of the disclosed embodiment the queue is disposed, offset from other travel lanes across the truck portals, and proximate walls of the logistic facility forming the truck portals.

In accordance with one or more aspects of the disclosed embodiment a method of unloading a truck with a collaborative logistic facility management system for a logistic facility is provided. The logistic facility includes storage locations for logistic goods or pallets, truck load or unload portals, and a travel space distributed through the logistic facility and communicably connecting the storage locations and truck load or unload portals for transfer of the logistic goods or pallets therebetween. The method includes:

providing multiple robot autonomous guided vehicles disposed so as to engage with and transport the logistics goods or pallets between truck portals and storage locations, the multiple robot autonomous guided vehicles being configured for autonomous guidance travel, in autonomous mode, throughout the travel space from each truck portal to each storage location, and including a collaborating operator input for collaborative autonomous guided vehicle navigation and guidance through at least part of the travel space in a collaborative mode;

commanding, with a system controller, the multiple robot autonomous guided vehicles to engage with the logistic goods or pallets and transfer the logistic goods or pallets between the truck portals and the storage locations;

identifying, with the system controller, a predetermined truck portal of a corresponding truck to be unloaded so as to transfer logistic goods or pallets to the storage locations; and generating, with the system controller, a predetermined collaborative zone in the at least part of the travel space adjacent the identified truck portal; and generating, with the system controller, a queue of robot autonomous guided vehicles on a side of the predetermined collaborative zone and commanding, with the system controller, the multiple robot autonomous guided vehicles disposed to unload the corresponding truck to move in autonomous mode into the queue.

In accordance with one or more aspects of the disclosed embodiment the predetermined collaborative zone is an autonomous mode robot autonomous guided vehicle interdiction zone.

In accordance with one or more aspects of the disclosed embodiment the predetermined collaborative zone connects the queue to truck load space through the truck portal so that a robot autonomous guided vehicle enters the truck load space from the queue through the predetermined collaborative zone in collaborative mode.

In accordance with one or more aspects of the disclosed embodiment the predetermined collaborative zone is sized and shaped conformal to a truck load configuration.

In accordance with one or more aspects of the disclosed embodiment the method further includes:
identifying, with the system controller, an order of the logistic goods or pallets in the truck load; and
sorting the multiple robot autonomous guided vehicles in the queue based on the order of the logistic goods or pallets in the truck load.

In accordance with one or more aspects of the disclosed embodiment the method further includes:
identifying, with the system controller, another side of the predetermined collaborative zone from which the multiple robot autonomous guided vehicles, in collaborative mode, exit the truck and the predetermined collaborative zone; and
in response to operator departure from the multiple robot autonomous guided vehicles, commanding autonomous mode travel of the robot autonomous guided vehicles in the travel space to a destination.

In accordance with one or more aspects of the disclosed embodiment the queue is disposed, offset from other travel lanes across the truck portals, and proximate walls of the logistic facility forming the truck portals.

In accordance with one or more aspects of the disclosed embodiment a method of loading a truck with a collaborative logistic facility management system for a logistic facility is provided. The logistic facility includes storage locations for logistic goods or pallets, truck load or unload portals, and a travel space distributed through the logistic facility and communicably connecting the storage locations and truck load or unload portals for transfer of the logistic goods or pallets therebetween. The method includes:
providing multiple robot autonomous guided vehicles disposed so as to engage with and transport the logistics goods or pallets between truck portals and storage locations, the multiple robot autonomous guided vehicles being configured for autonomous guidance travel, in autonomous mode, throughout the travel space from each truck portal to each storage location, and including a collaborating operator input for collaborative autonomous guided vehicle navigation and guidance through at least part of the travel space in a collaborative mode;
commanding, with a system controller, the multiple robot autonomous guided vehicles to engage with the logistic goods or pallets and transfer the logistic goods or pallets between the truck portals and the storage locations;
identifying, with the system controller, a predetermined truck portal of a corresponding truck to be loaded with logistic goods or pallets from the storage locations;
generating, with the system controller, a predetermined collaborative zone in the at least part of the travel space adjacent the identified truck portal; and
generating, with the system controller, a queue of robot autonomous guided vehicles on a side of the predetermined collaborative zone and commanding, with the system controller, the multiple robot autonomous guided vehicles disposed to load the corresponding truck to move in autonomous mode into the queue.

In accordance with one or more aspects of the disclosed embodiment the predetermined collaborative zone is an autonomous mode robot autonomous guided vehicle interdiction zone.

In accordance with one or more aspects of the disclosed embodiment the predetermined collaborative zone connects the queue to truck load space through the truck portal so that a robot autonomous guided vehicle enters the truck load space from the queue through the predetermined collaborative zone in collaborative mode.

In accordance with one or more aspects of the disclosed embodiment the predetermined collaborative zone is sized and shaped conformal to a truck load configuration.

In accordance with one or more aspects of the disclosed embodiment the method further includes:
identifying, with the system controller, an order of the logistic goods or pallets in the truck load; and
sorting the multiple robot autonomous guided vehicles in the queue based on the order of the logistic goods or pallets in the truck load.

In accordance with one or more aspects of the disclosed embodiment the method further includes:
identifying, with the system controller, another side of the predetermined collaborative zone from which the multiple robot autonomous guided vehicles, in collaborative mode, exit the truck and the predetermined collaborative zone; and
in response to operator departure from the multiple robot autonomous guided vehicles, commanding autonomous mode travel of the robot autonomous guided vehicles in the travel space to a destination.

In accordance with one or more aspects of the disclosed embodiment the queue is disposed, offset from other travel lanes across the truck portals, and proximate walls of the logistic facility forming the truck portals.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the invention.

What is claimed is:

1. A collaborative logistic facility management system for a logistic facility including storage locations for logistic goods or pallets, truck load or unload portals, and a travel space distributed through the logistic facility and communicably connecting the storage locations and truck load or unload portals for transfer of the logistic goods or pallets therebetween, the collaborative logistic facility management system comprising:
multiple robot autonomous guided vehicles disposed so as to engage with and transport the logistics goods or pallets between truck portals and storage locations, the multiple robot autonomous guided vehicles being configured for autonomous guidance travel, in autonomous mode, throughout the travel space from each truck portal to each storage location, and including a collaborating operator input for collaborative autonomous guided vehicle navigation and guidance through at least part of the travel space in a collaborative mode; and a system controller communicably coupled to each of the multiple robot autonomous guided vehicles and programmed to command each of the multiple robot autonomous guided vehicles to engage with the logistic goods or pallets and transfer the logistic goods or pallets between the truck portals and the storage locations, the system controller further being programmed to:

identify a predetermined truck portal of a corresponding truck to be loaded with logistic goods or pallets from the storage locations or to be unloaded so as to transfer logistic goods or pallets to the storage locations, and generate a predetermined collaborative zone in the at least part of the travel space adjacent the identified truck portal; and generate a queue of robot autonomous guided vehicles on a side of the predetermined collaborative zone and command the multiple robot autonomous guided vehicles disposed to load or unload the corresponding truck to move in autonomous mode into the queue.

2. The collaborative logistic facility management system of claim 1, wherein the predetermined collaborative zone is an autonomous mode robot autonomous guided vehicle interdiction zone.

3. The collaborative logistic facility management system of claim 1, wherein the predetermined collaborative zone connects the queue to truck load space through the truck portal so that a robot autonomous guided vehicle enters the truck load space from the queue through the predetermined collaborative zone in collaborative mode.

4. The collaborative logistic facility management system of claim 1, wherein the predetermined collaborative zone is sized and shaped conformal to a truck load configuration.

5. The collaborative logistic facility management system of claim 1, wherein the collaborative logistic facility management system is programmed to identify an order of the logistic goods or pallets in the truck load, and to sort the multiple robot autonomous guided vehicles in the queue based on the order of the logistic goods or pallets in the truck load.

6. The collaborative logistic facility management system of claim 1, wherein the collaborative logistic facility management system is programmed to identify another side of the predetermined collaborative zone from which the multiple robot autonomous guided vehicles, in collaborative mode, exit the truck and the predetermined collaborative zone, and in response to operator departure from the multiple robot autonomous guided vehicles command autonomous mode travel of the robot autonomous guided vehicles in the travel space to a destination.

7. The collaborative logistic facility management system of claim 1, wherein the queue is disposed, offset from other travel lanes across the truck portals, and proximate walls of the logistic facility forming the truck portals.

8. A method of unloading a truck with a collaborative logistic facility management system for a logistic facility including storage locations for logistic goods or pallets, truck load or unload portals, and a travel space distributed through the logistic facility and communicably connecting the storage locations and truck load or unload portals for transfer of the logistic goods or pallets therebetween, the method comprising:

providing multiple robot autonomous guided vehicles disposed so as to engage with and transport the logistics goods or pallets between truck portals and storage locations, the multiple robot autonomous guided vehicles being configured for autonomous guidance travel, in autonomous mode, throughout the travel space from each truck portal to each storage location, and including a collaborating operator input for collaborative autonomous guided vehicle navigation and guidance through at least part of the travel space in a collaborative mode;

commanding, with a system controller, the multiple robot autonomous guided vehicles to engage with the logistic goods or pallets and transfer the logistic goods or pallets between the truck portals and the storage locations;

identifying, with the system controller, a predetermined truck portal of a corresponding truck to be unloaded so as to transfer logistic goods or pallets to the storage locations; and generating, with the system controller, a predetermined collaborative zone in the at least part of the travel space adjacent the identified truck portal; and generating, with the system controller, a queue of robot autonomous guided vehicles on a side of the predetermined collaborative zone and commanding, with the system controller, the multiple robot autonomous guided vehicles disposed to unload the corresponding truck to move in autonomous mode into the queue.

9. The method of claim 8, wherein the predetermined collaborative zone is an autonomous mode robot autonomous guided vehicle interdiction zone.

10. The method of claim 8, wherein the predetermined collaborative zone connects the queue to truck load space through the truck portal so that a robot autonomous guided vehicle enters the truck load space from the queue through the predetermined collaborative zone in collaborative mode.

11. The method of claim 8, wherein the predetermined collaborative zone is sized and shaped conformal to a truck load configuration.

12. The method of claim 8, further comprising:
identifying, with the system controller, an order of the logistic goods or pallets in the truck load; and
sorting the multiple robot autonomous guided vehicles in the queue based on the order of the logistic goods or pallets in the truck load.

13. The method of claim 8, further comprising:
identifying, with the system controller, another side of the predetermined collaborative zone from which the multiple robot autonomous guided vehicles, in collaborative mode, exit the truck and the predetermined collaborative zone; and
in response to operator departure from the multiple robot autonomous guided vehicles, commanding autonomous mode travel of the robot autonomous guided vehicles in the travel space to a destination.

14. The method of claim 8, wherein the queue is disposed, offset from other travel lanes across the truck portals, and proximate walls of the logistic facility forming the truck portals.

15. A method of loading a truck with a collaborative logistic facility management system for a logistic facility including storage locations for logistic goods or pallets, truck load or unload portals, and a travel space distributed through the logistic facility and communicably connecting the storage locations and truck load or unload portals for transfer of the logistic goods or pallets therebetween, the method comprising:

provning multiple robot autonomous guided vehicles disposed so as to engage with and transport the logistics goods or pallets between truck portals and storage locations, the multiple robot autonomous guided vehicles being configured for autonomous guidance travel, in autonomous mode, throughout the travel space from each truck portal to each storage location, and including a collaborating operator input for collaborative autonomous guided vehicle navigation and guidance through at least part of the travel space in a collaborative mode;

commanding, with a system controller, the multiple robot autonomous guided vehicles to engage with the logistic goods or pallets and transfer the logistic goods or pallets between the truck portals and the storage locations;

identifying, with the system controller, a predetermined truck portal of a corresponding truck to be loaded with logistic goods or pallets from the storage locations;

generating, with the system controller, a predetermined collaborative zone in the at least part of the travel space adjacent the identified truck portal; and generating, with the system controller, a queue of robot autonomous guided vehicles on a side of the predetermined collaborative zone and commanding, with the system controller, the multiple robot autonomous guided vehicles disposed to load the corresponding truck to move in autonomous mode into the queue.

16. The method of claim 15, wherein the predetermined collaborative zone is an autonomous mode robot autonomous guided vehicle interdiction zone.

17. The method of claim 15, wherein the predetermined collaborative zone connects the queue to truck load space through the truck portal so that a robot autonomous guided vehicle enters the truck load space from the queue through the predetermined collaborative zone in collaborative mode.

18. The method of claim 15, wherein the predetermined collaborative zone is sized and shaped conformal to a truck load configuration.

19. The method of claim 15, further comprising:
identifying, with the system controller, an order of the logistic goods or pallets in the truck load; and
sorting the multiple robot autonomous guided vehicles in the queue based on the order of the logistic goods or pallets in the truck load.

20. The method of claim 15, further comprising:
identifying, with the system controller, another side of the predetermined collaborative zone from which the multiple robot autonomous guided vehicles, in collaborative mode, exit the truck and the predetermined collaborative zone; and
in response to operator departure from the multiple robot autonomous guided vehicles, commanding autonomous mode travel of the robot autonomous guided vehicles in the travel space to a destination.

21. The method of claim 15, wherein the queue is disposed, offset from other travel lanes across the truck portals, and proximate walls of the logistic facility forming the truck portals.

* * * * *

UNITED STATES PATENT AND TRADEMARK OFFICE
CERTIFICATE OF CORRECTION

PATENT NO. : 11,402,830 B2  
APPLICATION NO. : 16/585935  
DATED : August 2, 2022  
INVENTOR(S) : Robert Sullivan and Justin Holwell Page 1 of 1

It is certified that error appears in the above-identified patent and that said Letters Patent is hereby corrected as shown below:

On the Title Page

Please replace item (73) Assignee listed as:  
"Teradyne, Inc., North Reading, MA (US)"  
With:  
"Autoguide, LLC, Chelmsford, MA (US)"

Signed and Sealed this  
Sixth Day of August, 2024

Katherine Kelly Vidal  
*Director of the United States Patent and Trademark Office*